(12) United States Patent
Huang et al.

(10) Patent No.: US 11,100,023 B2
(45) Date of Patent: Aug. 24, 2021

(54) SYSTEM, APPARATUS AND METHOD FOR TUNNELING VALIDATED SECURITY INFORMATION

(71) Applicant: Intel Corporation, Santa Clara, CA (US)

(72) Inventors: Ruirui Huang, Portland, OR (US); Nilanjan Palit, Northborough, MA (US); Robert P. Adler, Santa Clara, CA (US); Ioannis T. Schoinas, Portland, OR (US); Avishay Snir, Regba (IL); Boris Dolgunov, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 808 days.

(21) Appl. No.: 15/718,178

(22) Filed: Sep. 28, 2017

(65) Prior Publication Data

US 2019/0095372 A1    Mar. 28, 2019

(51) Int. Cl.
| | | |
|---|---|---|
| G06F 13/40 | (2006.01) | |
| H04L 12/741 | (2013.01) | |
| G06F 15/78 | (2006.01) | |
| H04L 29/06 | (2006.01) | |

(52) U.S. Cl.
CPC ...... *G06F 13/4022* (2013.01); *G06F 15/7825* (2013.01); *H04L 45/74* (2013.01); *H04L 63/0272* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 7,394,809 B2* | 7/2008 | Kumar | ................ | H04L 45/302 |
| | | | | 370/392 |
| 7,684,398 B2* | 3/2010 | George | ................ | H04L 49/357 |
| | | | | 370/389 |
| 7,873,068 B2* | 1/2011 | Klinglesmith | ...... | H04L 12/6418 |
| | | | | 370/463 |
| 8,929,373 B2 | 1/2015 | Lakshmanamurthy et al. | | |
| 9,053,251 B2* | 6/2015 | Adler | .................... | G06F 13/366 |
| 9,419,647 B2* | 8/2016 | Gopal | ..................... | H03M 7/40 |
| | | (Continued) | | |

OTHER PUBLICATIONS

U.S. Appl. No. 15/391,984, filed Dec. 28, 2016, entitled "Method, Apparatus and System for Handling Non-Posted Memory Write Transactions in a Fabric," by Robert P. Adler, et al.

*Primary Examiner* — Nicholas Sloms
(74) *Attorney, Agent, or Firm* — Trop Pruner & Hu, P.C.

(57) ABSTRACT

In one example, a semiconductor die includes a plurality of agents and a fabric coupled to at least some of the plurality of agents. The fabric may include at least one router to provide communication between two or more of the plurality of agents, the at least one router coupled to a first agent of the plurality of agents, where the first agent is to send a first message to the at least one router, the first message comprising a first header including a first source identifier, and the at least one router is to validate that the first source identifier is associated with the first agent and if so to direct the first message towards a destination agent, and otherwise to prevent the first message from being directed towards the destination agent. Other embodiments are described and claimed.

20 Claims, 13 Drawing Sheets

(56) References Cited

U.S. PATENT DOCUMENTS

| | | | |
|---|---|---|---|
| 9,716,600 B1* | 7/2017 | Maluf | H04L 51/066 |
| 2007/0143605 A1* | 6/2007 | Metke | H04W 12/06 |
| | | | 713/168 |
| 2012/0066468 A1* | 3/2012 | Nakajima | G06F 13/4022 |
| | | | 711/165 |
| 2012/0079590 A1* | 3/2012 | Sastry | G06F 12/1458 |
| | | | 726/21 |
| 2013/0083794 A1* | 4/2013 | Lakshmanamurthy | H04L 12/28 |
| | | | 370/390 |
| 2013/0083798 A1* | 4/2013 | Lakshmanamurthy | G06F 15/7825 |
| | | | 370/392 |
| 2013/0086139 A1* | 4/2013 | Lakshmanamurthy | G06F 13/42 |
| | | | 709/202 |
| 2014/0082237 A1* | 3/2014 | Wertheimer | G06F 13/4022 |
| | | | 710/104 |
| 2014/0137231 A1* | 5/2014 | Sastry | G06F 13/385 |
| | | | 726/16 |
| 2014/0258583 A1* | 9/2014 | Lakshmanamurthy | G06F 13/364 |
| | | | 710/312 |
| 2014/0282819 A1* | 9/2014 | Sastry | G06F 21/57 |
| | | | 726/1 |
| 2015/0019788 A1* | 1/2015 | Adler | G06F 13/4221 |
| | | | 710/313 |
| 2015/0092779 A1* | 4/2015 | Lakshmanamurthy | G06F 13/4022 |
| | | | 370/392 |
| 2016/0132447 A1* | 5/2016 | Lakshmanamurthy | G06F 13/4265 |
| | | | 710/116 |

* cited by examiner

SYSTEM, APPARATUS AND METHOD FOR TUNNELING VALIDATED SECURITY INFORMATION

TECHNICAL FIELD

Embodiments relate to communication of information in a computing system.

BACKGROUND

Mainstream processor chips such as system on chips (SoCs) are highly segmented due to varying requirements from different market segments, e.g., server, desktop, mobile, embedded, ultra-mobile and mobile Internet device segments. Different markets seek to use SoC solutions that combine at least some of processor cores, memory controllers, input/output controllers and other segment specific acceleration elements onto a single chip. Integrating different intellectual property (IP) blocks on a single die can be difficult as IP blocks can have various requirements and design uniqueness, and can require many specialized wires, communication protocols and so forth to enable their incorporation into an SoC. As a result, each SoC or other advanced semiconductor device that is developed typically requires a great amount of design complexity and customization to incorporate different IP blocks into a single device. This is so, as a given IP block typically is re-designed to accommodate interface and signaling requirements of a given SoC.

To enable routing packets through a system, typically a header is provided with the packet that includes information to aid in routing and decoding the packet. Different communication protocols provide for different header arrangements. However, these header formats are typically fixed and prevent flexibility to provide additional information by way of the header. In one protocol, security information is provided as additional header information, included in a so-called expanded header. However including additional information can increase bandwidth consumption and adversely impact performance.

DETAILED DESCRIPTION

Figure 1:
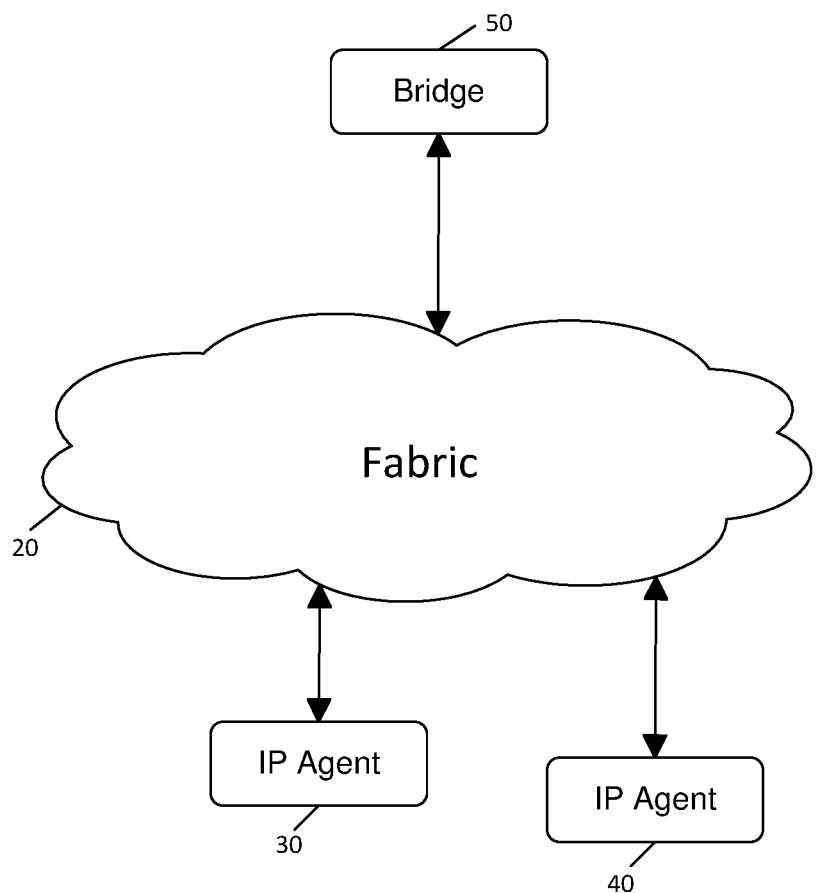
FIG. 1 is a block diagram of a basic interconnect architecture in accordance with an embodiment of the present invention.

In various embodiments, techniques are provided to reduce an amount of information to be communicated in transactions between agents in a system. In an embodiment, this reduction in communication may enable devices to communicate with improved performance and reduced bandwidth overhead. Although embodiments described herein are in connection with sideband communications on a sideband link that couples various agents, understand the scope of the present invention is not limited in this regard and the techniques described herein may be used in connection with communications on a wide variety of interconnects.

Embodiments can be used in many different types of systems. As examples, implementations described herein may be used in connection with semiconductor devices such as processors or other semiconductor devices that can be fabricated on a single semiconductor die. In particular implementations, the device may be a SoC, network on chip (NoC) or other advanced processor or chipset that includes various homogeneous and/or heterogeneous processing agents, and additional components such as networking components, e.g., routers, controllers, bridge devices, devices, memories and so forth.

Note that the reduction of information may be associated with communication of security information between devices. In one particular embodiment, this information communication that is avoided using an embodiment is security privilege information that identifies a given security attribute of an initiator agent of a transaction. With this reduction in information to be communicated, the size of a transaction format may be reduced. For example, a given communication protocol may call for a format in which this security privilege information is included in one or more expanded headers of a transaction. By removing the security privilege information from being part of the transaction, communication of one or more expanded headers is avoided. Use of an expanded header to carry security information may consume an additional 100% bandwidth for simple messages and up to an additional 50% bandwidth for a message with data. As such, embodiments may realize high performance benefits.

In one particular embodiment, the sideband interconnect via which transactions proceed is according to an integrated on-chip system fabric (IOSF) specification issued by a semiconductor manufacturer such as Intel Corporation to provide a standardized on-die interconnect protocol for attaching intellectual property (IP) blocks within a chip such as an SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

In this communication protocol, the information that may be removed from a transaction is security privilege information, which may correspond to a given security privilege level (such as security attribute of initiator (SAI) information). Without using an embodiment, removal of security privilege information from transactions would adversely impact security. Namely, in the absence of an embodiment, transactions without this SAI information would be always treated as trusted, thus weakening a security foundation and overall robustness of a platform should any transaction source be compromised by an attacker. Or such transactions would always be treated as untrusted, and a requested access would be prevented due to lack of trust.

Note that in some embodiments, routing fabrics can remain completely agnostic to information present in expanded headers and only specific target agents can comprehend such an expanded header. If a transaction having a SAI expanded header is destined to a target agent that is configured to enforce access control policy, the target agent may use the SAI information in that header. If instead the transaction is destined to a target agent that has no resources configured for access control protection, that agent can ignore the expanded header and process the standard message header and corresponding message payload.

In various embodiments, a hardware validated source identifier (SrcID) may be used to tunnel or substitute for security privilege information. As used herein, understand that the terms "tunnel" or "tunneling" mean an ability to communicate particular information from a source to a destination, without actual communication of the information itself. Note that this definition of "tunneling" is in contrast to a conventional usage of the term "tunneling." That is, in typical environments, tunneling means that information of a given format or communication protocol is embedded in or encapsulated within a communication of another format and/or communication protocol. However, this conventional tunneling includes the desired information to be communicated. In contrast herein, the so-called tunneled information is not present whatsoever in the communication.

In embodiments herein, a source identifier that is transformed in a destination agent to the security privilege information is part of a baseline header of a sideband transaction. To provide protection to ensure that this source information is not spoofed, one or more hardware resources, such as one or more sideband routers, may perform a hardware validation of this source information, prior to communicating the transaction towards its destination. In this way, the SrcID is brought to the same trusted level as the SAI information. This allows a translation from SrcID to SAI at a destination endpoint to leverage SAI-based access control within the destination agent.

In turn, a destination agent that receives a transaction that does not include security privilege information uses the included source identifier to perform a lookup operation to obtain original security privilege information of the source agent based on this lookup. Thereafter, the destination agent may, based upon the security privilege information, perform appropriate internal access control checks.

Tunneling as described herein allows the use of hardware-validated SrcIDs to relay SAI information. In other words, instead of sending this SAI information in an expanded header, the destination endpoint performs a lookup using the incoming SrcID. Based on the lookup, the destination agent asserts an appropriate SAI value. Before allowing this transaction to proceed to destination agent, the sideband router, e.g., validates the SrcID against an allowed list present in a routing table for that ingress port. This hardware check thus ensures that a SrcID cannot be spoofed. In embodiments, the router may be fixed at compile time for a given product.

In embodiments, one or more selected destination agents may include or be associated with a SrcID-to-SAI lookup table (LUT) to enable a mapping of the incoming SrcID to SAI values. As SAI continues to be the information on which the destination agent bases its access control decision, the SrcID-to-SAI translation by way of access to the lookup table is done before any access control decision. Understand that the SrcID is used to tunnel SAI information, and it is not meant to replace SAI. Stated another way, the SrcID is not used for access control directly to ensure chassis access control compatibility.

Note that a source endpoint that can initiate such SAI tunneling may also be configured to maintain information regarding which destination endpoints are capable of handling a security tunneling protocol described herein. This is the case, as the techniques described herein may be used as an optional feature only for endpoints involved in performance sensitive flows. As such, there may be destination agents not having a SrcID-to-SAI capability. Additionally, as one SrcID may only map to one SAI value at the destination agent, where a source endpoint can generate more than one SAI, only one SAI may be tunneled through the SrcID. In turn, the remainder of the SAI values can be communicated via standard expanded headers. In some embodiments, a single source endpoint can generate multiple SrcID values (through a single physical port). In such a case, a single one of the SrcIDs may be used to tunnel SAI information, which may be set by hardware and not programmable.

In an embodiment, a source agent may include or be associated with model specific strap(s) to indicate whether SAI tunneling is enabled under certain scenarios, referred to herein as a SAI_TUN_SRC_EN strap. This strap determines whether the source agent may omit SAI-based expanded headers under certain conditions, assuming the associated destination endpoint(s) are configured for SrcID-to-SAI translation (i.e., an AND condition with a tunneling mask described below). In an embodiment, such model specific straps may be defined by a SoC product designer, requested for source endpoint IPs/subsystems to implement, and set at integration time. In a particular embodiment, a source agent may maintain a list of compatible destination agents enabled for the techniques herein, namely destination endpoints having a SrcID-to-SAI lookup table. This information may be maintained in the form of a so-called tunneling mask, referred to herein as SAI_TUN_EN_MASK[ ].

Conceptually, the SAI_TUN_EN_MASK[ ] indicates which destination endpoints have a SrcID-to-SAI LUT. For a destination endpoint with DestID=='X', if SAI_TUN_EN_MASK[X]==1, then the destination endpoint has a SrcID-to-SAI LUT.

In some embodiments, a global override for a given source agent may be provided which, when set, causes the source endpoint to always send SAI information. In other words, this override is a fail-safe switch to enforce always sending out expanded headers with SAI information.

Table 1 is an illustration of source endpoint SAI tunneling behavior in accordance with an embodiment of the present invention.

TABLE 1

For transactions targeted as DestID "X"

| SAI_TUN_SRC_EN strap == 1 && SAI_TUN_EN_MASK[X] == 1 | SAI_TUN_SRC_EN strap == 0 \|\| SAI_TUN_EN_MASK[X] == 0 |
|---|---|
| - For IPs with a single SAI value and single SrcID:<br>   - Don't generate SAI expanded header (EH)<br>- For IPs with multiple SAI and/or SrcID values:<br>   - Don't generate SAI EH for a specific SAI per SrcID | Always generate SAI EH |

In order to use the SAI tunneling feature, a destination endpoint similarly includes tunneling protocol information. In a particular embodiment, destination agents may include model specific strap(s) to indicate whether SAI tunneling is enabled under certain scenarios, referred to as a SAI_TUN_TGT_EN strap. Such a strap is used to indicate whether a source identifier of an incoming transaction is to be used to access a SrcID-to-SAI LUT if there is no SAI-based expanded header present. In an embodiment, this LUT may be bypassed if the incoming transaction has a SAI-based expanded header present. Additionally, if an incoming SrcID is not present in the LUT, a DEVICE_UN-TRUSTED_SAI can be asserted. In an embodiment, this assertion means that if a device has a permission for this untrusted assertion, the transaction proceeds normally, otherwise the destination agent processes the transaction as if it does not have permission for the resource that it is trying to access. In an embodiment, this handling generally means a posted transaction may be dropped, and a non-posted transaction may be handled as an unsupported request.

While it is possible to have SrcID-to-SAI LUTs of different agents configured differently (such that a single SrcID may be mapped to different SAI values in different LUTs), in an embodiment the LUTs may be configured to be consistent among all destination agents including such LUT to reduce complexity. In other words, with this configuration one SrcID is always to be translated to the same SAI value among all LUTs.

Table 2 is an illustration of destination endpoint SAI tunneling behavior in accordance with an embodiment of the present invention.

TABLE 2

| SAI_TUN_TGT_EN strap == 1 | SAI_TUN_TGT_EN strap == 0 |
|---|---|
| - If SAI EH present, use incoming SAI (no LUT usage)<br>- With no incoming SAI: Check SrcID-to-SAI LUT<br>  a) If present, use SAI from LUT<br>  b) If not present, use DEVICE_UNTRUSTED_SAI | 1. If SAI EH present, use incoming SAI<br>2. With no incoming SAI: use DEVICE_UNTRUSTED_SAI |

Embodiments thus may be used to alleviate the overhead of communicating security privilege information. Understand that while the tunnel techniques are described herein for security privilege information, embodiments are not limited. That is, in other situations the tunneling techniques may be used to enable reduced overhead for communication of other information. Embodiments thus may be used to remove significant bandwidth and performance overhead while maintaining security robustness in SoCs and other computing devices.

Referring now to FIG. 1, shown is a block diagram of a basic interconnect architecture in accordance with an embodiment of the present invention. As shown in FIG. 1, system 10 may be a portion of a SoC or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
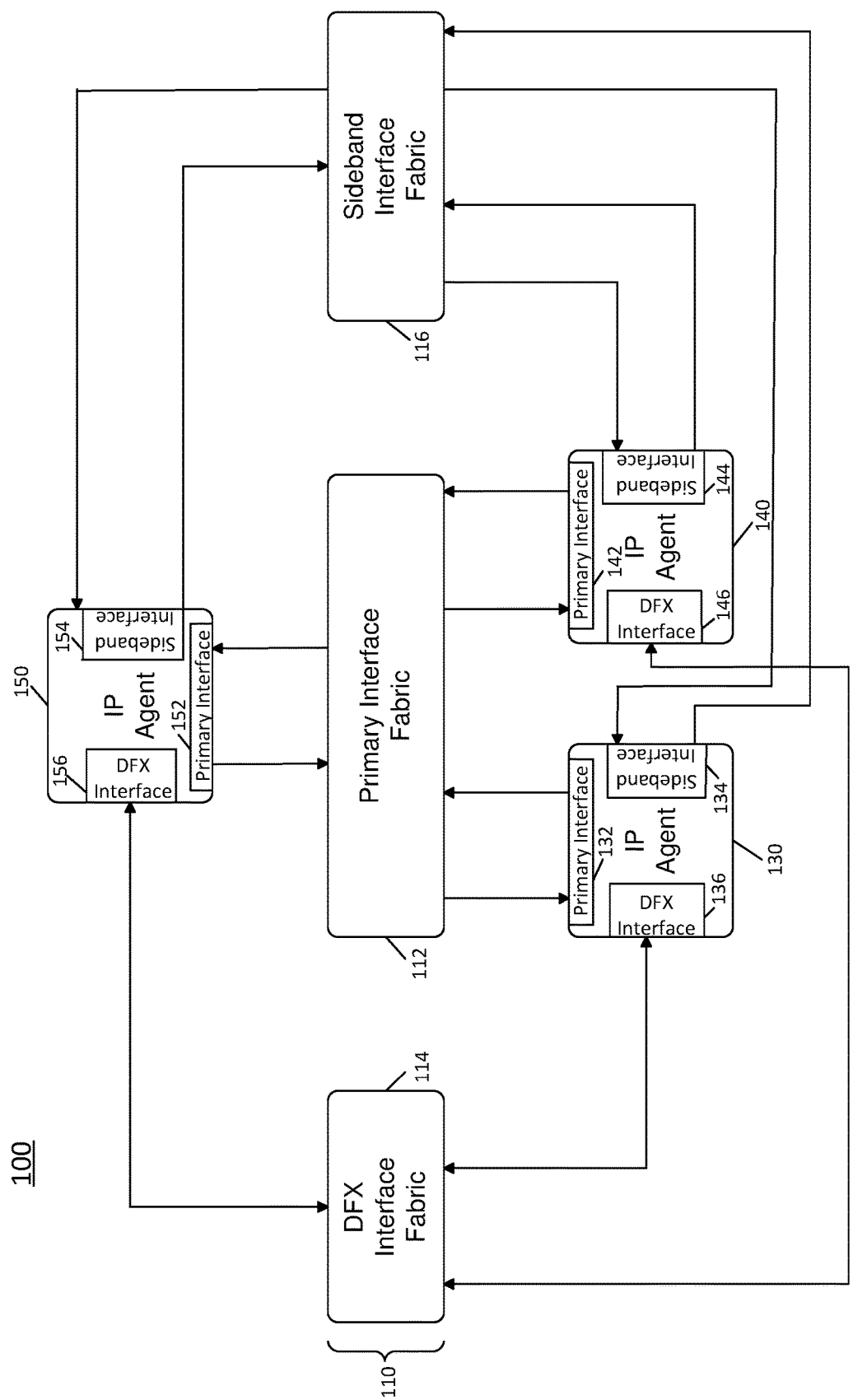
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Using an IOSF specification, various types of chips can be designed having a wide variety of different functionality.

Figure 3:
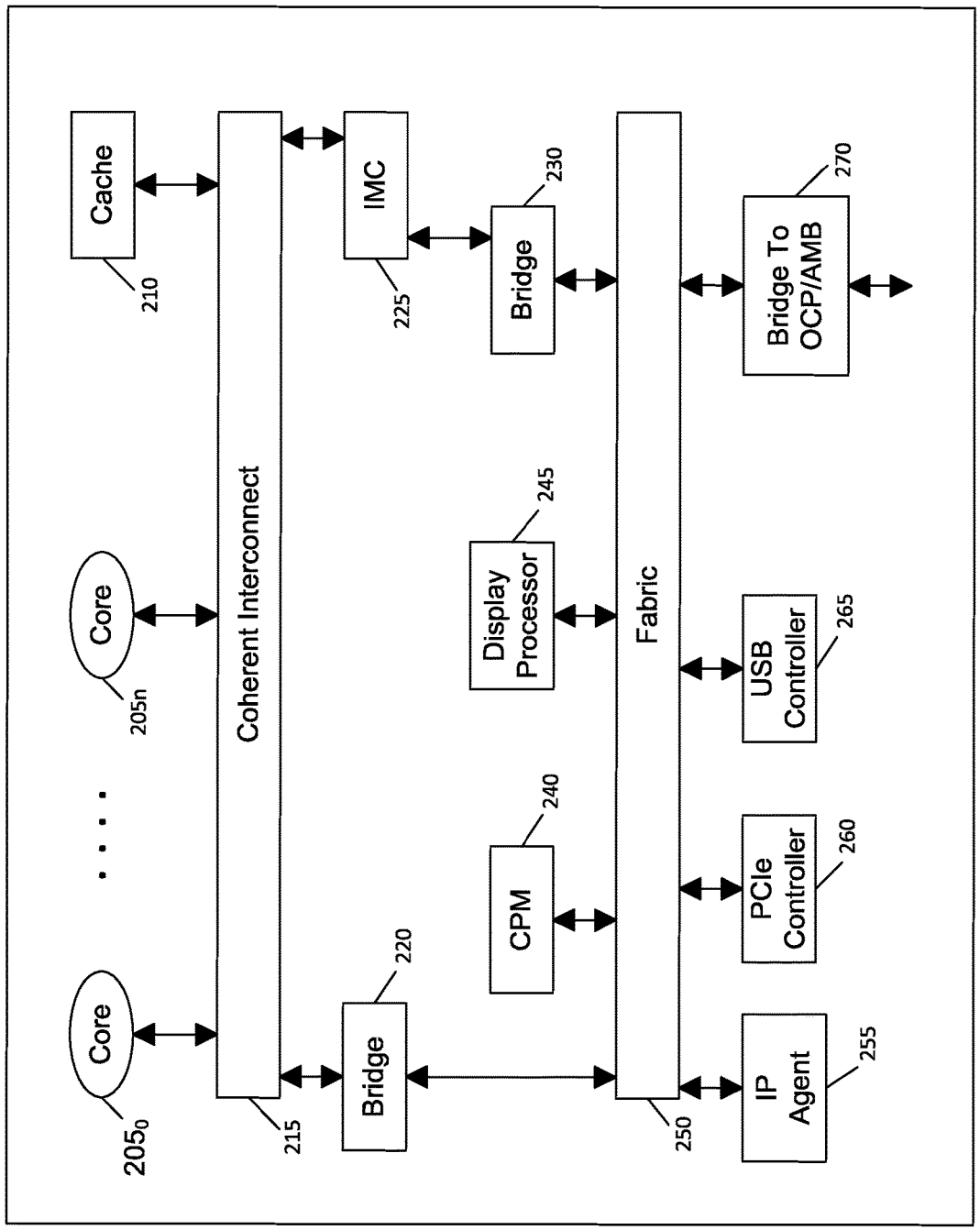
FIG. 3 is a high level block diagram of a SoC in accordance with an embodiment of the present invention.

Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC).

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250. Various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
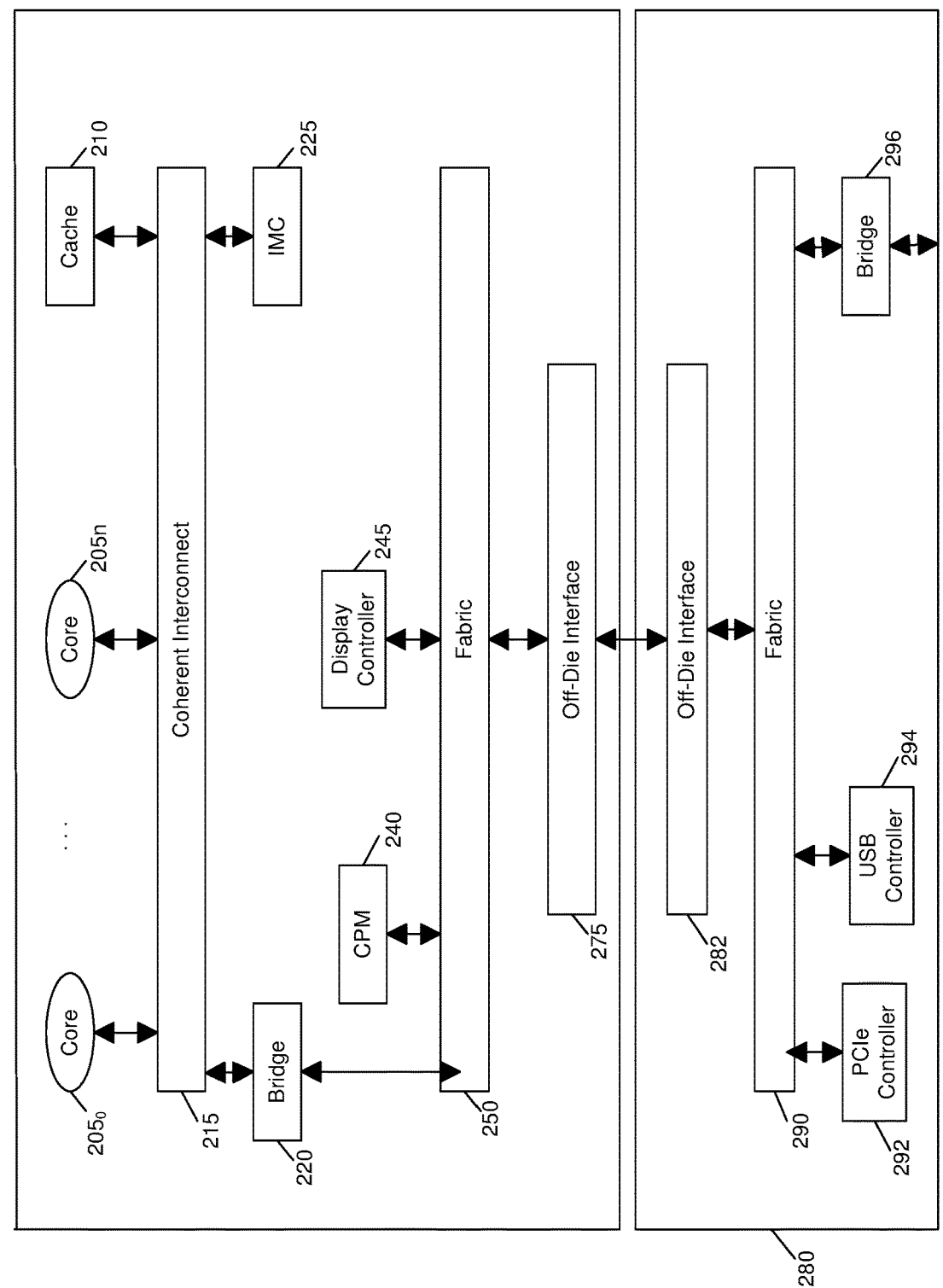
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
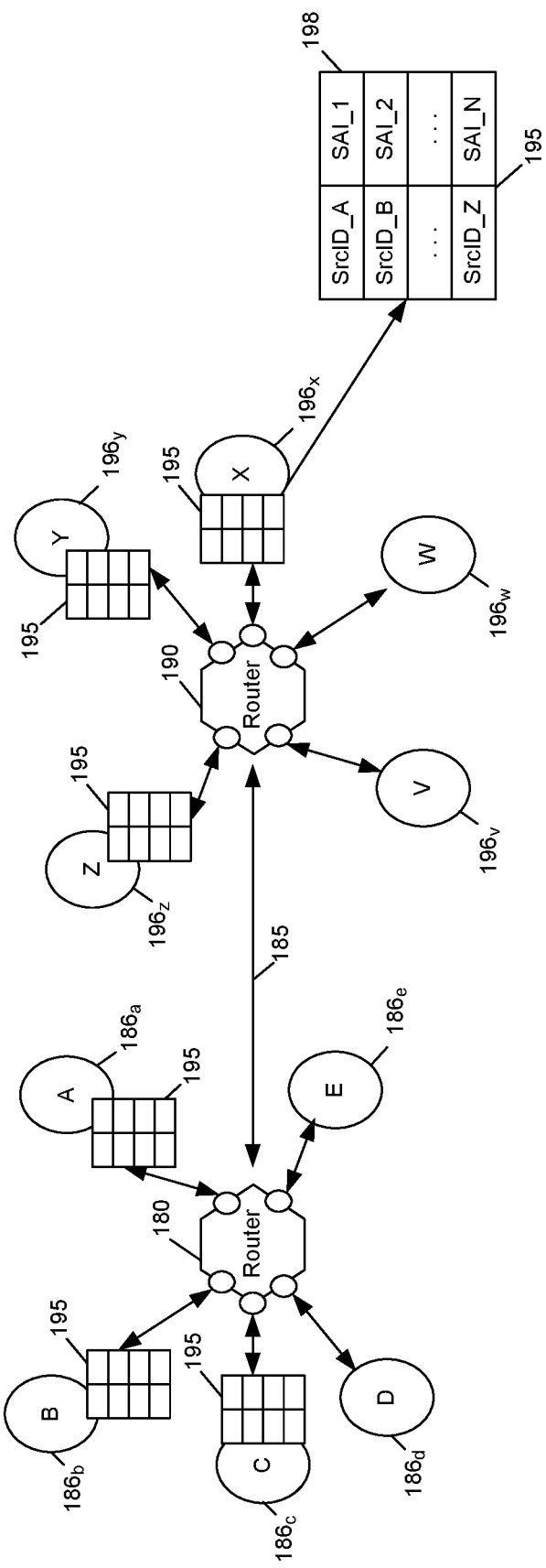
FIG. 5 is a block diagram of a sideband interconnection in accordance with an embodiment of the present invention.

As discussed above, in various embodiments all out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints 186*a*-186*e* and router 190 couples to a plurality of endpoints 196*x*-196*z*.

To enable reduction in the amount of transactions sent with expanded headers as described herein, note that certain endpoints 186, 196 may include or otherwise be associated with Src ID-to-SAI lookup tables 195. However note also in FIG. 5 that certain endpoints (namely endpoints 186*d, e* and endpoints 196*w, v*) do not include such lookup tables. As such, transactions directed to these endpoints may still include expanded headers including SAI information since these endpoints are not configured to perform lookups as described herein. Further note that in an embodiment, all tables 195 may be consistent, namely including the same information. Thus as shown in detail with regard to endpoint 196*x*, lookup table 195 includes multiple entries 198 each including a mapping between a source identifier and an SAI value. In one embodiment, each table may include an entry for all endpoints within a SoC. Understand further with reference to FIG. 5, that routers 180, 190 include routing tables that, in addition to having routing information, further include source identifier information and port identifiers for corresponding endpoints such that the routers may perform hardware-based validation of source identifiers before allowing transactions to proceed, as described herein.

Figure 6:
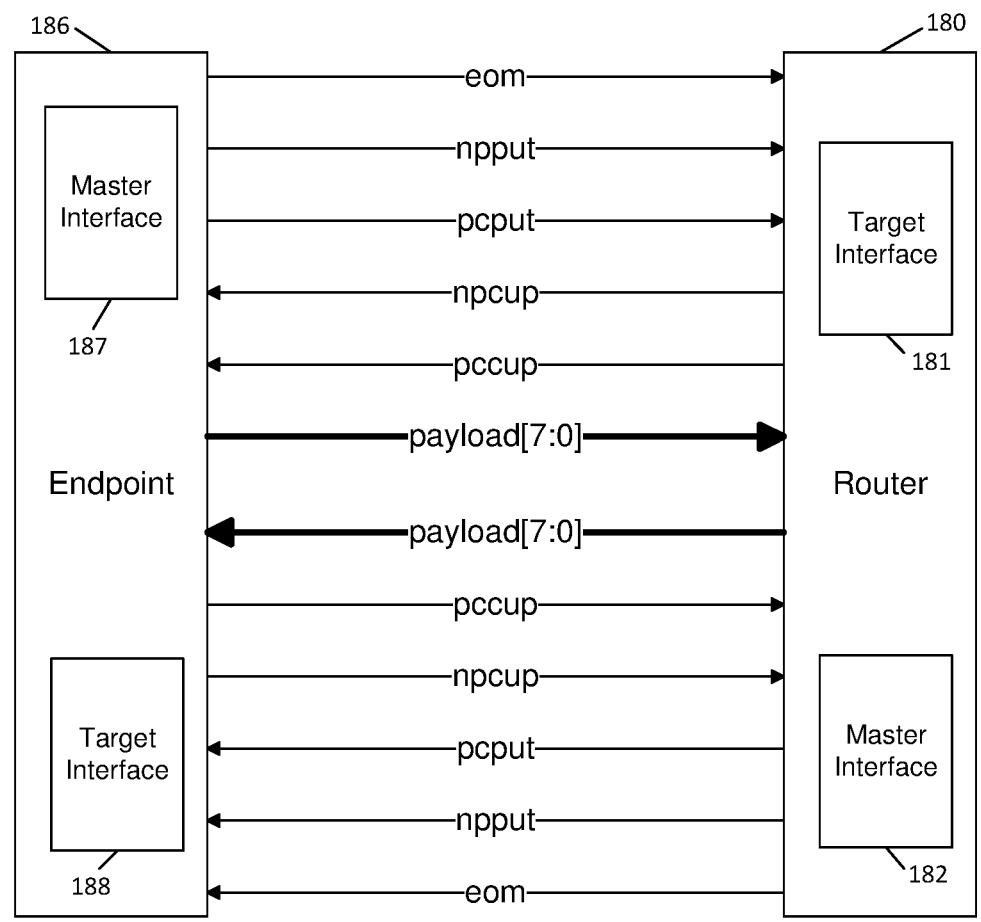
FIG. 6 is a block diagram of details of signaling available for a sideband interface in accordance with an embodiment of the present invention.

Referring now to FIG. 6, shown is a block diagram of details of signaling available for a sideband interface in accordance with an embodiment of the present invention. As shown in FIG. 6, interconnection between a router 180 and an endpoint 186 is shown. As seen, router 180 may include a target interface 181 and a master interface 182. In general, target interface 181 may be configured to receive incoming signals, while master interface 182 may be configured to transmit outgoing signals. As seen, endpoint 186 also includes a master interface 187 and a target interface 188.

FIG. 6 further shows details of the various signaling available for the sideband interface, including credit information, put information, end of message signaling, and data. Specifically, credit updates can be communicated via sideband interfaces as a non-posted credit update signal (NPCUP) and a posted credit update signal (PCCUP). In addition, put signals may be provided (NPPUT and PCPUT). In addition, an end of message (EOM) signal can be communicated. Finally, data may be communicated via payload packets which in one embodiment can be implemented via a byte-wide communication channel. Although shown with this particular implementation in the embodiment of FIG. 6, the scope of the present invention is not limited in this regard. Whenever a credit Put signal is high, this means that a credit is being returned. Whenever a put signal is high, it means that the payload (e.g., data) signal is valid. Whenever a Put and EOM are high at the same time, it means that the current payload is the last payload of the message. Note that the interface can both "put" a data payload and "put" a credit in the same clock cycle.

In various implementations, sideband messages may carry additional header information in one or more expanded headers. As used herein the term "additional header information" is used to refer to greater amounts of information (and potentially of different types) and/or different arrangement than information present in a standard header according to a given interface specification. In one embodiment, each expanded header can be a length of a conventional header, which in the embodiment described herein is one DW in length. The number of expanded headers in a message can be product specific. Different agents in a system may initiate messages expanded with a different number of expanded headers. To identify the presence of an expanded header, in some embodiments an expanded header (EH) indicator, e.g., a single bit, can be present in the standard header of every message to indicate the presence of an optional expanded header, namely the addition of another header of the standard header length. In turn, an EH indicator in every expanded header indicates the presence of a subsequent expanded header of the standard header length. If present, one or more expanded headers can be appended after the standard header (e.g., after the first DW in a system having a DW standard header length).

Figure 7:
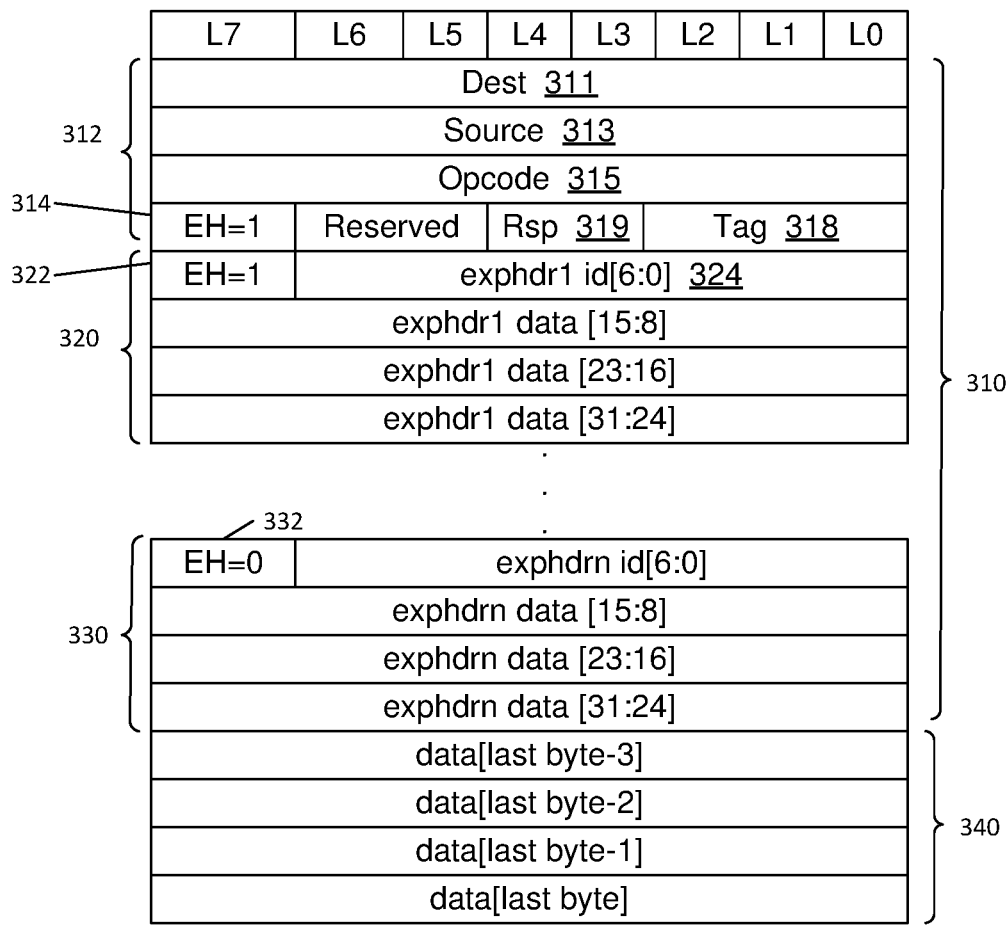
FIG. 7 is an illustration of a message having a header portion and a data portion in accordance with one embodiment of the present invention.

FIG. 7 illustrates a message 300 having a header portion 310 and a data portion 340, where the header portion 310 can include up to N expanded headers. All other sideband messages follow the same expanded header format.

As shown in the example of FIG. 7, an EH indicator 314 is set in a first header 312 which may be a standard header of the IOSF specification to indicate the presence of a first expanded header ((ExpHdr1)) 320. As seen in FIG. 7, first header 312 includes various additional fields, including a destination field 311, a source field 313, an opcode field 315, a tag field 318 and a response field 319. As seen in the FIG. 7 embodiment, EH indicator 314 may be present in a last flow control unit (flit) of the header, namely a most significant bit (MSB) of this flit, although the scope of the present invention is not limited in this regard.

In various embodiments, for each expanded header that follows the first header, its EH indicator may instead be present within the first flit of the corresponding expanded header. Thus as seen in FIG. 7, first expanded header 320 includes an EH indicator 322 present in the first flit of the header 320, along with a header identifier field (e.g., a header ID) 324. The expanded header ID field 324, ExpHdr ID[6:0], may identify the specific header extension ID. In various embodiments, the identifier may indicate a particular type of expanded header determined according to the IOSF specification, rather than being specific to the agent generating the header. As an example, the IOSF specification currently defines an expanded header identifier for purposes of providing SAI, and in one embodiment the expanded header field may have a binary value of 0000000. If an agent receives an expanded header with an ID of 0000000, it knows that the data contained within that expanded header is an SAI.

In embodiments, EHs can be avoided for sending security privilege information such as SAI information when a given source agent is enabled to send this information and a corresponding destination agent is capable of obtaining underlying SAI information using the source identifier of the standard header.

Setting the EH indicator in the first expanded header (ExpHdr1) indicates the presence of a second expanded header, and so forth. The EH indicator 332 in the last expanded header (ExpHdrN) 330 is not set, indicating that the current expanded header is the last expanded header. As seen in FIG. 7, data payload flits start after the last expanded header 330.

All target agents, regardless of whether they interpret any expanded header content, can be configured to comprehend message formatting with expanded headers present, and further to support the ability to distinguish expanded headers from message and data payload. Any expanded header with an ExpHdr ID field that is not supported by a target agent can be dropped, not alias to a supported ExpHdr ID, and not affect the agent's processing of the received message. In various embodiments, routers can be configured to use only the standard header (e.g., the first header DW) to determine the message type and route it to its target agent. To maintain accuracy within a system, the routers may further be configured to forward messages with expanded headers without changing any attributes in the expanded headers.

Figure 8:
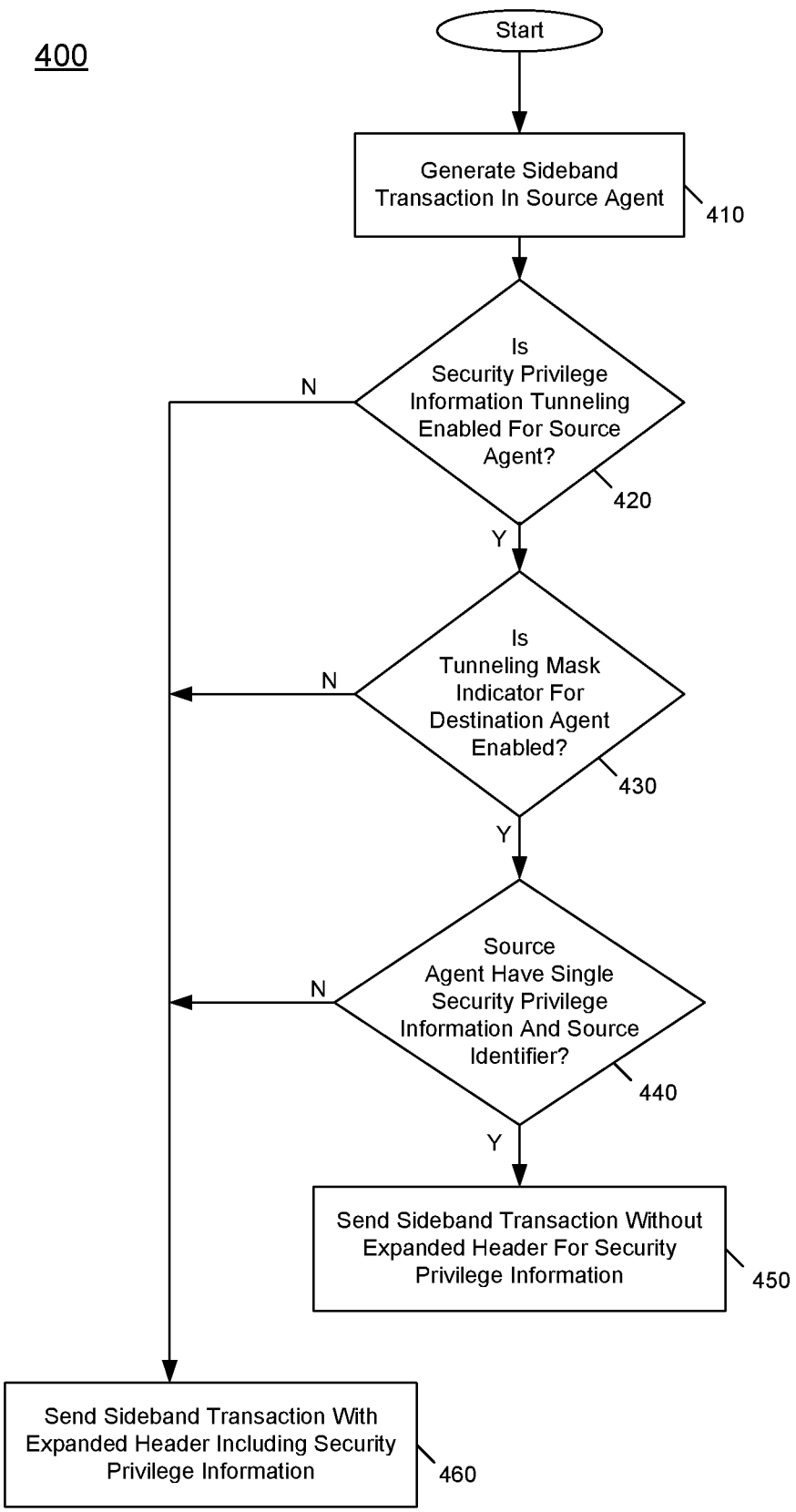
FIG. 8 is a flow diagram of a method in accordance with an embodiment of the present invention.

Referring now to FIG. 8, shown is a flow diagram of a method in accordance with an embodiment of the present invention. More specifically, method 400 shown in FIG. 8 is a method for performing security privilege information tunneling, from the perspective of a source agent. As such, method 400 may be performed by hardware circuitry, software, firmware and/or combinations thereof.

As shown in FIG. 8, method 400 begins by generating a sideband transaction in a source agent (block 410). Although the scope of the present invention is not limited in this regard, one example sideband transaction is a power management communication, such as communication of power management status or other telemetry information of the source agent. Note that this power management message may have a limited payload, such that the overhead expense of including one or more expanded headers to provide security privilege information such as SAI information may be unnecessarily high. Of course other types of transactions (sideband or in-band) that may benefit from tunneling of security privilege information as described herein may include diverse transactions. One example may be used for access to a register by a hardware requesting entity that is always known to be safe (e.g., because it is a hardware finite state machine). In one case a save/restore engine may use tunneling to read/write register information of a remote agent into a local storage, to enable power to be removed from the remote agent.

Control next passes to diamond 420 to determine whether security privilege information tunneling is enabled for the source agent. In an embodiment, strap information may be accessed to make this determination. In one particular embodiment, this strap information may be set to indicate that the source agent is enabled for this tunneling. If so, control next passes to diamond 430 to determine whether a tunneling mask indicator for a destination agent of the transaction is enabled. In an embodiment, the source agent may include or may access a tunneling mask which, in an embodiment, may be implemented as a given storage such as a register that includes an indicator for each agent or endpoint with which the source agent is to communicate. When this tunneling mask indicator is set, it means that the corresponding destination agent is capable of performing the security privilege information tunneling described herein. And if the destination agent is not so capable, the indicator is of a reset state.

Assuming that the destination agent is enabled for tunneling as determined at diamond 430, control next passes to diamond 440 where it may be determined whether the source agent has a single security privilege information value and source identifier. Note that in certain cases, an agent may be associated with multiple source identifiers. And it is also possible that a given agent may be associated with multiple security privilege information values, such as multiple SAI values. If the source agent is only associated with a single security privilege information value and source identifier, then the tunneling described herein may occur. As such, control passes to block 450 where the sideband transaction may be sent without an expanded header. More specifically, the source agent may send the sideband transaction without security privilege information. Understand that in some cases this sideband transaction may include an expanded header to include other information. Note that in a situation where a source agent has multiple source identifiers and/or security privilege information values, it may be possible for a particular source identifier and corresponding security privilege information to be identified as a default value for which the tunneling described herein may occur. If so, for such particular transactions, this tunneling may occur at block 450.

Still with reference to FIG. 8, instead if the sideband transaction is not eligible for the tunneling operation described herein, control passes to block 460 where the sideband transaction is sent with an expanded header that includes security privilege information. In a particular embodiment, the sideband transaction may be sent with an expanded header having SAI information. Understand that in any event, when the sideband transaction (with or without an expanded header including SAI information) is received in a sideband router, the sideband router may perform source identifier-based validation to confirm that the source identifier of the sideband transaction is associated with the source agent, to detect spoofing attempts. While shown at this high level in the embodiment of FIG. 8, many variations and alternatives are possible.

Figure 9:
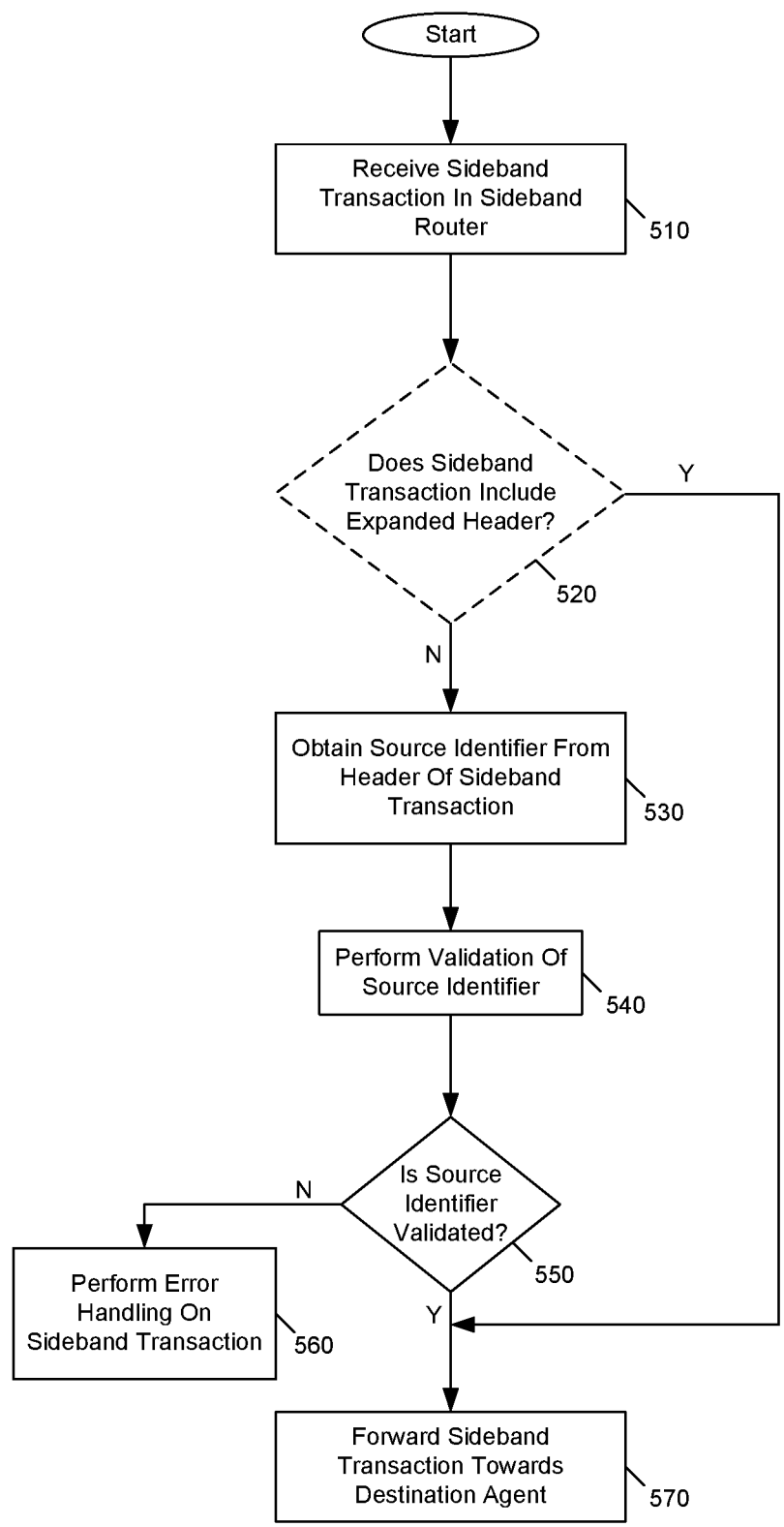
FIG. 9 is a flow diagram of a method in accordance with another embodiment of the present invention.

Referring now to FIG. 9, shown is a flow diagram of a method in accordance with another embodiment of the present invention. More specifically, method 500 of FIG. 9 is a method for handling incoming transactions in a sideband router to accommodate security privilege information tunneling as described herein. As such, method 500 may be performed by hardware circuitry, firmware, software and/or combinations thereof. As illustrated, method 500 begins by receiving a sideband transaction in a sideband router (block 510). As one example, this sideband transaction may be received in the sideband router from one of multiple IP agents coupled to the sideband router, e.g., that is a source of the transaction. Of course in other cases, a sideband router may receive a transaction from an intermediate entity on a network path from a source agent to a destination agent.

Next at optional diamond 520 it is determined whether the sideband transaction includes an expanded header. This optional determination may be performed in embodiments in which the source identifier validation of method 500 is performed only for transactions proceeding through a sideband router without included SAI or other security privilege information. Instead in an embodiment in which all transactions are to be validated, this optional determination at diamond 520 may not be performed. Where the source identifier validation is only performed for transactions not having expanded headers, this determination at diamond 520 proceeds. If the sideband router determines that the transaction includes an expanded header, control passes directly to block 570 where the sideband transaction may be forwarded to its destination. For example, the sideband router may, based on destination information of the transaction, access one or more routing tables of the sideband router to identify where to send the packet. For example, based on a mapping present in the routing table(s), the sideband router may send the packet to an IP agent locally attached to the router. Or in another case, the sideband router may forward the sideband transaction to another sideband router that in turn is coupled to the destination. Of course, the transaction may proceed through intermediate hops through a network before it reaches its destination.

Still with reference to FIG. 9, instead if the determination at diamond 520 indicates that the sideband transaction does not include an expanded header (or the optional determination at diamond 520 does not occur), control passes to block 530. At block 530 a source identifier may be obtained from the header of the sideband transaction. Next, at block 540 a validation of this source identifier is performed. In an embodiment, the sideband router may include a validation table that maps or associates source identifiers with particular agents. In this way, the sideband router having access to this validation table can verify or validate that a correct source identifier is included in this sideband packet generated by a correct source agent. Stated another way, by use of this validation table, an attempt by a source agent to include a spoofed source identifier of a different agent can be prevented. In another embodiment, a reverse routing table look up may be performed. Here a port identifier and a source identifier can be used to determine whether the expected port identifier was the physical port on which the packet ingressed.

Based on this validation (however performed), it is determined at diamond 550 whether this source identifier is validated. If so, control passes to block 570, discussed above. Otherwise, control passes to block 560 where error handling may be performed on the sideband transaction. Note that the sideband router may take different actions when it is not able to validate a source identifier. For example, the sideband router may issue a machine check exception, log an error message in an error or security log, or take another action, such as reporting the non-validation as a possible security threat or attack, an unsuccessful completion for a non-posted transaction, or a wire indicating an error. Understand while shown at this high level in the embodiment of FIG. 9, many variations and alternatives are possible.

Figure 10:
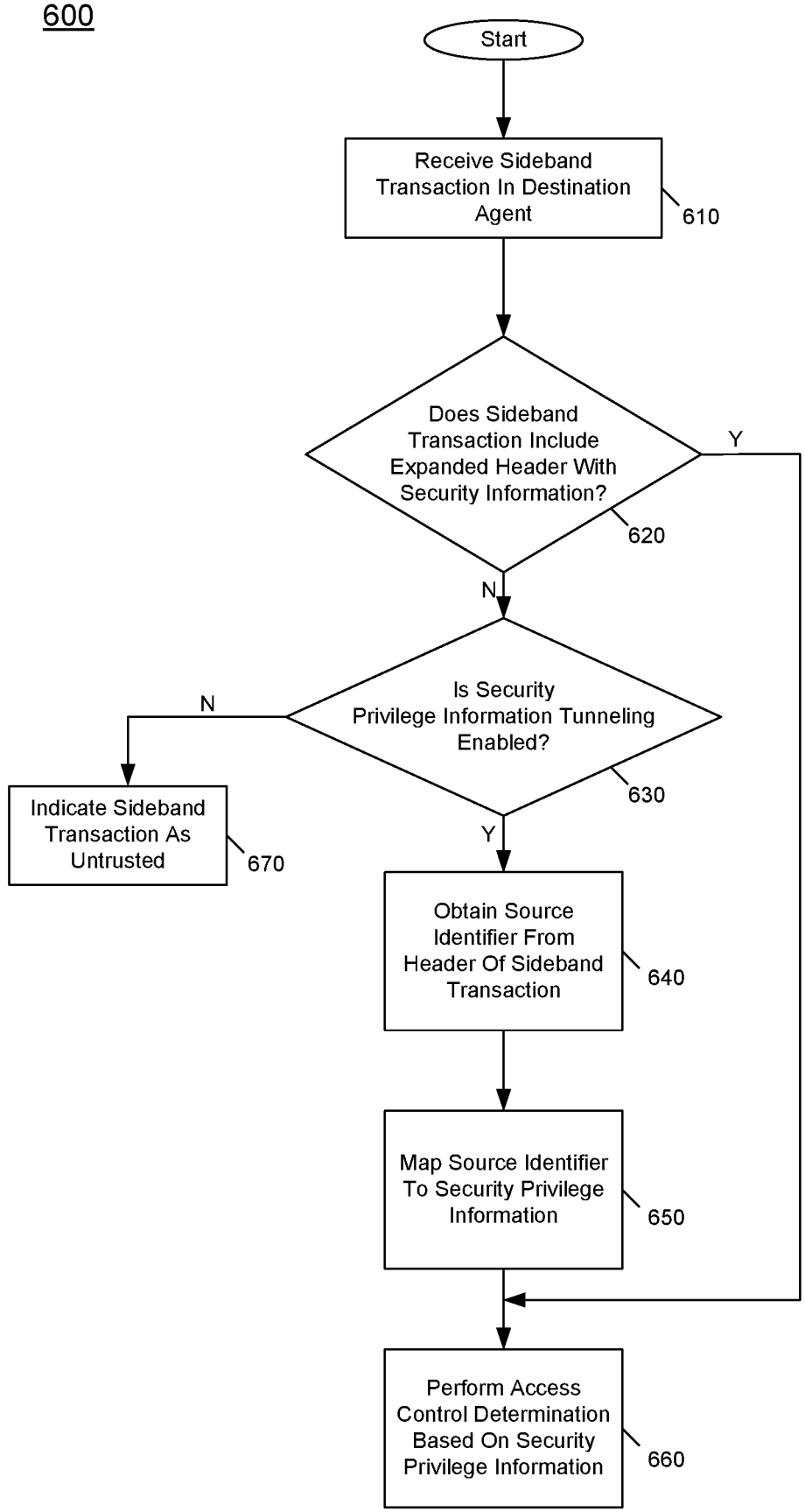
FIG. 10 is a flow diagram of a method in accordance with yet another embodiment of the present invention.

Referring now to FIG. 10, shown is a flow diagram of a method in accordance with yet another embodiment of the present invention. As illustrated in FIG. 10, method 600 is a method for handling incoming sideband transactions with tunneled security privilege information in accordance with an embodiment. As illustrated, method 600 begins by receiving a sideband transaction in a destination agent (block 610). For example, the destination agent, which may be a given IP block, receives an incoming transaction from a sideband router to which it is coupled. Next it is determined at diamond 620 whether the sideband transaction includes an expanded header with security information. If so, control directly passes to block 660 where an access control determination may be performed based on security privilege information present in the expanded header. In one embodiment, SAI information included in the expanded header may be used to determine whether an access requested by the sideband transaction is allowed to proceed. For example, the SAI may be looked up in a policy register to determine if it has access, or it can be compared against a strap that provides info on which SAIs have access to a given the source. If the access is allowed to proceed, the destination agent may undertake the requested action of the corresponding sideband transaction. Otherwise, the access is not allowed, and the destination agent may error handle the transaction.

Still with reference to FIG. 10, if it is determined that the transaction does not have an expanded header, control instead passes to diamond 630 to determine whether security privilege information tunneling is enabled in this destination agent. In an embodiment, strap information for the destination agent may provide this indication as to whether such tunneling is enabled for this agent. For example, a SAI tunneling target enable strap may be set to indicate that the destination agent is capable of handling such tunneled packets.

Otherwise if tunneling is not enabled for this destination agent, control passes to block 670 where the sideband transaction may be indicated as untrusted. As such the access control determination may allow the transaction to proceed if the policy register/strap indicates that the resource being accessed allows access by "untrusted" agents, or if the agent does not check for access permission to this resource, otherwise the transaction may be error handled.

Still with reference to FIG. 10, if it is determined (at diamond 630) that the destination agent is enabled for security privilege information tunneling, control passes to block 640. At block 640 a source identifier can be obtained from a header of the transaction. Then at block 650 this source identifier may be mapped to security privilege information. For example, a lookup table of the destination agent may be accessed using the source identifier to obtain security privilege information (e.g., SAI information). Control then proceeds to block 660, discussed above where the destination agent may perform an access control determination based on this security privilege information that in this instance has been tunneled from the source agent, via access to the lookup table present in the destination agent. As such, the overhead of including SAI or other security privilege information in one or more expanded headers of the sideband transaction can be avoided, reducing latency while increasing bandwidth. Understand while shown at this high level in the embodiment of FIG. 10, many variations and alternatives are possible.

Figure 11:
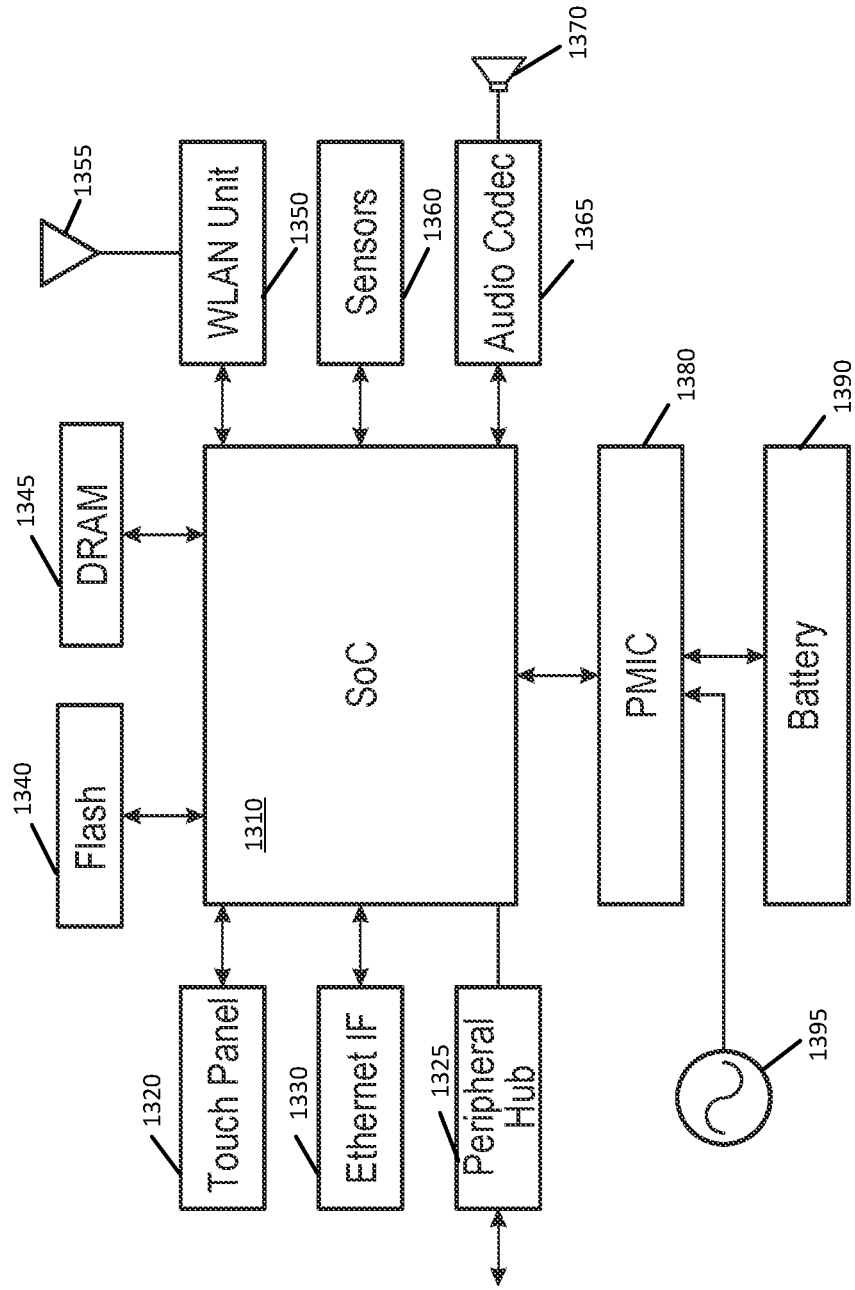
FIG. 11 is a block diagram of an example system with which embodiments may be used.

Referring now to FIG. 11, shown is a block diagram of an example system with which embodiments may be used. In the illustration of FIG. 11, system 1300 may be a mobile low-power system such as a tablet computer, 2:1 tablet, phablet or other convertible or standalone tablet system. As illustrated, a SoC 1310 is present and may be configured to operate as an application processor for the device. SoC 1310 may include agents and fabrics to tunnel security privilege information as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 11, to provide for wireless capabilities, a WLAN unit 1350 is coupled to SoC 1310 and in turn to an antenna 1355. In various implementations, WLAN unit 1350 may provide for communication according to one or more wireless protocols. As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 11, many variations and alternatives are possible.

Figure 12:
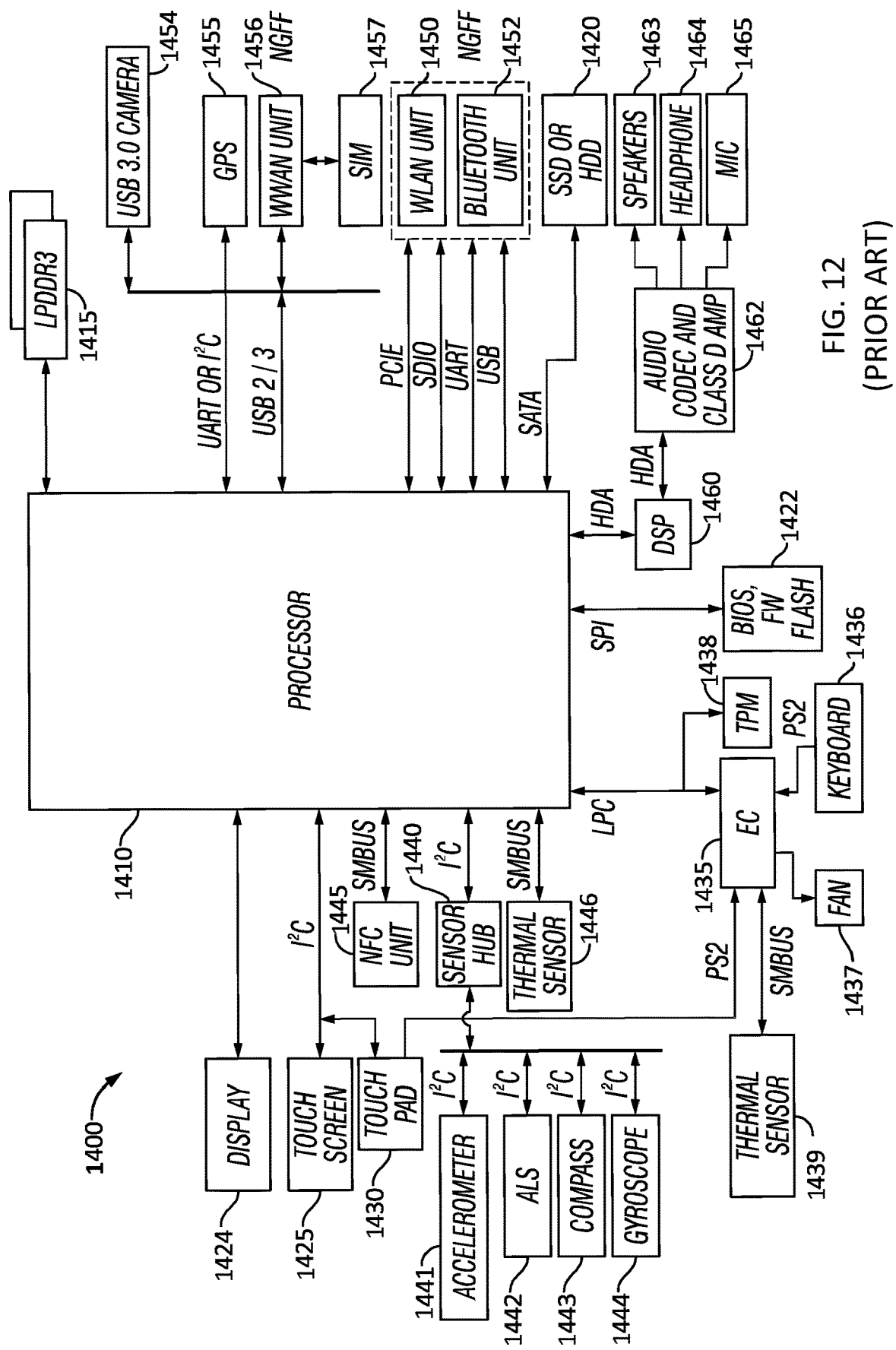
FIG. 12 is a block diagram of a representative computer system.

Referring now to FIG. 12, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC, and may include agents and fabrics to perform tunneling as described herein to reduce communication of transactions with expanded headers. Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 12, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 12 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 12, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 12, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 12, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 12, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 12, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 12, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 12, understand the scope of the present invention is not limited in this regard.

Figure 13:
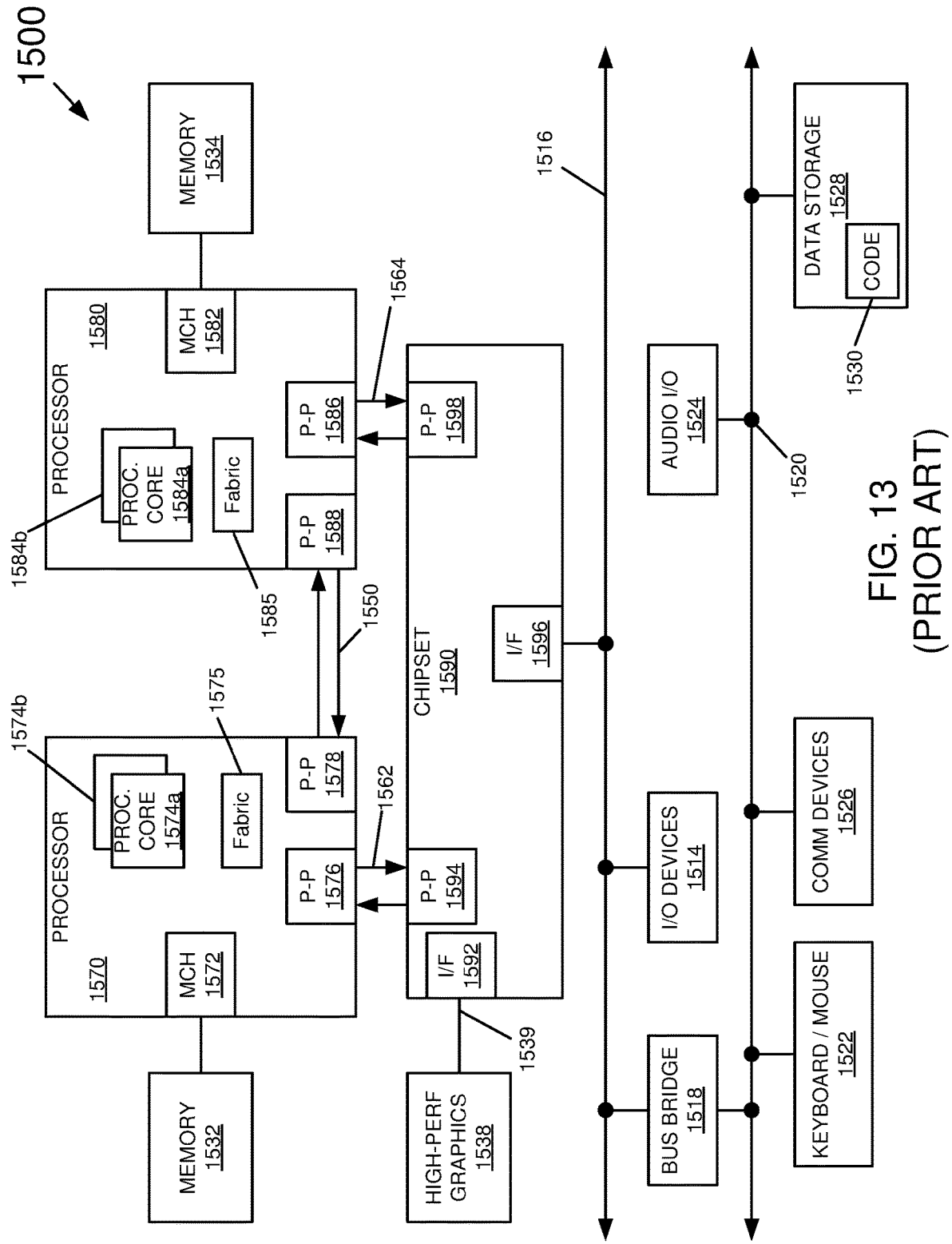
FIG. 13 is a block diagram of a system in accordance with an embodiment of the present invention

Embodiments may be implemented in many different system types. Referring now to FIG. 13, shown is a block diagram of a system in accordance with an embodiment of the present invention. As shown in FIG. 13, multiprocessor system 1500 is a point-to-point interconnect system, and includes a first processor 1570 and a second processor 1580 coupled via a point-to-point interconnect 1550. As shown in FIG. 13, each of processors 1570 and 1580 may be multicore processors, including first and second processor cores (i.e., processor cores 1574a and 1574b and processor cores 1584a and 1584b), although potentially many more cores may be present in the processors. Each of the processors can include a fabric (1575, 1585) or other interconnect circuit to perform source identifier-based validations, to enable tunneling of information such as security privilege information as described herein.

Still referring to FIG. 13, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 12, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 13, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 12, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following examples pertain to further embodiments.

In one example, an apparatus includes a semiconductor die comprising: a plurality of agents; and a fabric coupled to at least some of the plurality of agents, the fabric including at least one router to provide communication between two or more of the plurality of agents, the at least one router coupled to a first agent of the plurality of agents via a message interface, where the first agent is to send a first message to the at least one router via the message interface, the first message comprising a first header including a first source identifier, and the at least one router is to validate that the first source identifier is associated with the first agent and if so to direct the first message towards a destination agent, and otherwise to prevent the first message from being directed towards the destination agent.

In an example, the first agent is associated with a plurality of source identifiers, and when the first agent is to send a second message associated with a second source identifier of the plurality of source identifiers, the first agent is to send the second message comprising a first header and an expanded header, the first agent to set an expanded header indicator of the first header to indicate presence of the expanded header and include security attribute information in the expanded header.

In an example, the first agent is to access a tunnel mask to determine whether to send the first message without an expanded header, based on an indicator of the tunnel mask associated with the destination agent.

In an example, the first agent is to send the first message without the expanded header further in response to a tunnel enable indicator of a first state for the source agent.

In an example, the first agent, in response to the tunnel enable indicator of a second state, is to send a plurality of messages with an expanded header having security attribute information.

In an example, the destination agent comprises a table including a plurality of entries each associated with one of the plurality of agents and to store a mapping between a source identifier and security privilege information.

In an example, at least some of the plurality of agents comprise the table including the plurality of entries, the table coherent in the at least some of the plurality of agents.

In an example, the message interface comprises a sideband message interface comprising a point-to-point interconnect to couple the at least one router to the first endpoint of the first agent.

In an example, the apparatus comprises a SoC including the plurality of agents and the fabric fabricated on the semiconductor die.

In another example, a method comprises: receiving, in a router of an integrated circuit, a transaction, the transaction including a source identifier of a source agent that generated the transaction; validating, in the router, the transaction, according to a routing table of the router, to verify that the source identifier is associated with the source agent; and in response to validating the transaction, directing the transaction to a destination agent associated with a destination identifier included in the transaction.

In an example, the method further comprises, in response to not verifying that the source identifier is associated with the source agent, preventing the transaction from being directed to the destination agent.

In an example, the method further comprises generating, in the source agent, the transaction, comprising: determining that the source agent is enabled for security privilege tunneling; and determining that the destination agent is enabled for the security privilege tunneling.

In an example, the method further comprises generating the transaction including security privilege information in response to determining that at least one of the source agent and the destination agent is not enabled for the security privilege tunneling.

In an example, the transaction comprises a message of a first length, and the method further comprises generating, in the source agent, a second transaction including the security privilege information, the second transaction having a second length greater than the first length.

In an example, the method further comprises: receiving the transaction in the destination agent; and obtaining the source identifier from the transaction, and accessing a table using the source identifier to obtain security privilege information for the source agent.

In an example, the method further comprises performing an access control determination in the destination agent using the security privilege information.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a SoC comprises: at least one core to execute instructions; an interconnect coupled to the at least one core; and a fabric coupled to the interconnect to couple a first agent and a second agent and including a router coupled between the first agent and the second agent, where the second agent is to receive a first message initiated by the first agent, use a source identifier of the first message to obtain security privilege information of the first agent, and perform an access control determination as to the first message based at least in part on the security privilege information.

In an example, the second agent comprises a table including a plurality of entries each to store, for an agent of the SoC, a mapping between a source identifier and security privilege information, the second agent to access the table using the source identifier of the first message to obtain the security privilege information.

In an example, the second agent is to receive a second message having a first header and one or more expanded headers following the first header, where a first expanded header of the one or more expanded headers includes the security privilege information of the first agent.

In an example, the router is to validate that the source identifier is associated with the first agent, based on a routing table, and in response to the validation send the first message to the second agent, and drop the first message if the source identifier if not validated.

In a still further example, an apparatus comprises: means for receiving a transaction including a source identifier of a source means that generated the transaction; means for validating the transaction to verify that the source identifier is associated with the source means; and means for directing the transaction to a destination means associated with a destination identifier included in the transaction, in response to the means for validating verifying that the source identifier is associated with the source means.

In an example, the apparatus further comprises means for preventing the transaction from being directed to the destination means in response to the means for validating not verifying that the source identifier is associated with the source means.

In an example, the apparatus further comprises means for determining that the source means and the destination means are enabled for security privilege tunneling.

In an example, the apparatus further comprises means for generating the transaction including security privilege information in response to the means for determining that at least one of the source means and the destination means are not enabled for the security privilege tunneling.

In an example, the apparatus further comprises means for obtaining security privilege information for the source means using the source identifier from the transaction.

In an example, the apparatus further comprises means for performing an access control determination using the security privilege information.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A semiconductor die comprising:
   a plurality of agents; and
   a fabric coupled to at least some of the plurality of agents, the fabric including at least one router to provide communication between two or more of the plurality of agents, the at least one router coupled to a first agent of the plurality of agents via a message interface,
   wherein the first agent is configured to:
      upon a determination that a destination agent is configured to perform security privilege information tunneling, generate a first message comprising a first header including a first source identifier for transmission to the destination agent via the at least one router,
      upon a determination that the destination agent is not configured to perform security privilege information tunneling, generate the first message comprising the first header and an expanded header including security attribute information for transmission to the destination agent via the at least one router, and
      transmit the first message to the at least one router via the message interface,
   and wherein the at least one router is configured to:
      upon a determination that the first message does not include the expanded header, determine whether the first source identifier is associated with the first agent and if so to direct the first message towards the destination agent, and otherwise prevent the first message from being directed towards the destination agent, and upon a determination that the first message comprises the expanded header, direct the first message towards the destination agent.

2. The apparatus of claim 1, wherein the first agent is associated with a plurality of source identifiers, and when the first agent is to send a second message associated with a second source identifier of the plurality of source identifiers, the first agent is to send the second message comprising the first header and the expanded header the first agent to set an expanded header indicator of the first header to indicate presence of the expanded header.

3. The apparatus of claim 1, wherein the first agent is to access a tunnel mask to determine whether to send the first message without the expanded header based on an indicator of the tunnel mask associated with the destination agent.

4. The apparatus of claim 3, wherein the first agent is to send the first message without the expanded header further in response to security privilege information tunneling being enabled for the first agent.

5. The apparatus of claim 3, wherein the first agent, in response to security privilege information tunneling being disabled for the first agent, is to send the first message with the expanded header having the security attribute information.

6. The apparatus of claim 1, wherein the destination agent comprises a table including a plurality of entries, each of the plurality of entries associated with one of the plurality of agents and to store a mapping between a source identifier and security privilege information.

7. The apparatus of claim 6, wherein at least some of the plurality of agents comprise the table including the plurality of entries, the table coherent in the at least some of the plurality of agents.

8. The apparatus of claim 1, wherein the message interface comprises a sideband message interface comprising a point-to-point interconnect to couple the at least one router to a first endpoint of the first agent.

9. The apparatus of claim 1, wherein the apparatus comprises a system on a chip (SoC) including the plurality of agents and the fabric fabricated on the semiconductor die.

10. A non-transitory machine-readable medium having stored thereon instructions, which if performed by a machine cause the machine to perform a method comprising:

receiving, in a router of an integrated circuit, a transaction, the transaction including a first header comprising a source identifier of a source agent that generated the transaction and a destination identifier associated with a destination agent;

upon a determination that the transaction does not include an expanded header including security privilege information:

validating, in the router, the transaction, according to a routing table of the router, to verify that the source identifier is associated with the source agent; and in response to validating the transaction, directing the transaction to the destination agent associated with the destination identifier included in the transaction; and upon a determination that the transaction includes the expanded header including the security privilege information, directing the transaction to the destination agent associated with the destination identifier included in the transaction.

11. The non-transitory machine-readable medium of claim 10, wherein the method further comprises, in response to not verifying that the source identifier is associated with the source agent, preventing the transaction from being directed to the destination agent.

12. The non-transitory machine-readable medium of claim 10, wherein the method further comprises generating, in the source agent, the transaction, comprising:

determining that the source agent is enabled for security privilege information tunneling; and determining that the destination agent is enabled for the security privilege information tunneling.

13. The non-transitory machine-readable medium of claim 12, wherein the method further comprises generating the transaction including the security privilege information in response to determining that at least one of the source agent and the destination agent is not enabled for the security privilege information tunneling.

14. The non-transitory machine-readable medium of claim 12, wherein the method further comprises:

generating, in the source agent, a first transaction comprising a first message including the first header; and generating, in the source agent, a second transaction comprising the first message including the first header and the expanded header including the security privilege information, the second transaction having a second length greater than a first length of the first transaction.

15. The non-transitory machine-readable medium of claim 10, wherein the method further comprises:

receiving the transaction in the destination agent; and obtaining the source identifier from the transaction, and accessing a table using the source identifier to obtain security privilege information for the source agent.

16. The non-transitory machine-readable medium of claim 15, wherein the method further comprises performing an access control determination in the destination agent using the security privilege information.

17. A system on a chip (SoC) comprising:

at least one core to execute instructions;

an interconnect coupled to the at least one core; and a fabric coupled to the interconnect to couple a first agent and a second agent and including a router coupled between the first agent and the second agent, wherein the second agent is configured to:

receive a first message initiated by the first agent, the first message comprising a first header including a source identifier of the first agent, upon a determination that the first message does not include a first expanded header including security privilege information of the first agent, use the source identifier of the first message to obtain the security privilege information of the first agent, and perform an access control determination as to the first message based at least in part on the security privilege information.

18. The SoC of claim 17, wherein the second agent comprises a table including a plurality of entries, each of the plurality of entries to store, for an agent of the SoC, a mapping between a source identifier and security privilege information, the second agent to access the table using the source identifier of the first message to obtain the security privilege information of the first agent.

19. The SoC of claim 17, wherein the second agent is to receive a second message having the first header and one or more expanded headers following the first header, wherein the first expanded header of the one or more expanded headers includes the security privilege information of the first agent.

20. The SoC of claim 17, wherein upon the determination that the first message does not include the first expanded header including the security privilege information of the first agent, the router is to validate that the source identifier is associated with the first agent based on a routing table, and in response to the validation send the first message to the second agent, and drop the first message if the source identifier is not validated.

* * * * *